United States Patent [19]
Grau et al.

[11] Patent Number: 6,010,162
[45] Date of Patent: Jan. 4, 2000

[54] CLIP FITTING FOR A HOSE

[75] Inventors: Jeffrey M. Grau, Maumee, Ohio; Juergen Schmidt, Rastatt, Germany

[73] Assignee: Aeroquip Corporation, Maumee, Ohio

[21] Appl. No.: 09/161,213

[22] Filed: Sep. 25, 1998

[51] Int. Cl.⁷ ................................................ F16L 33/00
[52] U.S. Cl. ...................... 285/257; 285/243; 285/256; 285/351
[58] Field of Search .................... 285/242, 243, 285/256, 259, 257, 252, 253, 351

[56] References Cited

U.S. PATENT DOCUMENTS

| | | |
|---|---|---|
| 1,073,850 | 9/1913 | Greer ................................... 285/259 X |
| 1,679,709 | 8/1928 | Cooper . |
| 3,174,777 | 3/1965 | Lodholm et al. . |
| 3,463,517 | 8/1969 | Courtot et al. . |
| 3,574,355 | 4/1971 | Oetiker ................................. 285/243 X |
| 4,093,282 | 6/1978 | Kyriakodis . |
| 4,275,484 | 6/1981 | Irio et al. . |
| 4,607,867 | 8/1986 | Jansen . |
| 5,144,726 | 9/1992 | Calmettes et al. . |
| 5,208,949 | 5/1993 | Calmettes et al. . |
| 5,216,783 | 6/1993 | Calmettes et al. . |
| 5,387,016 | 2/1995 | Joseph et al. ........................ 285/256 X |
| 5,530,996 | 7/1996 | Calmettes et al. . |
| 5,553,358 | 9/1996 | Calmettes et al. . |

FOREIGN PATENT DOCUMENTS

| | | | |
|---|---|---|---|
| 212881 | 4/1957 | Australia | ................................ 285/253 |
| 2177769 | 1/1987 | United Kingdom | ................... 285/252 |
| WO 93/16317 | 8/1993 | WIPO . | |
| WO 95/33157 | 12/1995 | WIPO . | |

OTHER PUBLICATIONS

Bulletin No. EA048, Aeroquip Corporation, pp. 3–4, undated.

*Primary Examiner*—Dave W. Arola
*Attorney, Agent, or Firm*—Emch, Schaffer, Schaub & Porcello Co., L.P.A.

[57] ABSTRACT

A clip fitting for a hose that includes a hose nipple defining at least one circular groove. A circular seal is positioned in the groove. At least one hose clip is mounted on the hose nipple. At least one clamp is positioned on the hose clip over the seal. The fitting provides an improved seal between the hose and the nipple.

15 Claims, 7 Drawing Sheets

CLIP FITTING FOR A HOSE

BACKGROUND OF THE INVENTION

The present invention relates generally to a clip fitting for a hose. More specifically, the invention is directed to a clip fitting having, among other things, at least one hose clip mounted on a hose nipple that includes at least one O-ring seal wherein the hose clip positions at least one clamp over the O-ring seal.

Many polyamide lined air-conditioning (A/C) system hoses are inflexible due to the thickness of the polyamide layer. This can cause hose routing difficulties, especially for field assembled lines when installing retrofit mobile A/C units.

The present invention provides an improved clip fitting for a relatively flexible polyamide veneer A/C hose. It has been found that the present invention provides excellent sealing performance between the fitting and the flexible hose over wide temperature and pressure ranges as compared to prior art fittings.

An example of a prior art fitting is shown in International Publication No. WO 95/33157 (Manuli). The Manuli reference discloses a hose fitting for A/C applications. The fitting includes a hose nipple that contains two rectangular circumferential grooves that accept gaskets. The purpose of the gaskets is to form a seal between a polyamide inner hose lining and the nipple O.D. When a force is applied perpendicular to and towards the axis of the hose, on the gaskets' arced surfaces, the gaskets deform in both directions parallel to the axis of the hose. This is permitted by the width of the grooves which are significantly wider than the gaskets. Hose clamps located over the gaskets and the interference fit between the hose and nipple are responsible for the force which causes the deformation of the gaskets. The shape of the gaskets provides resistance to removal of the gaskets from the grooves during assembly of the hose to the nipple.

Nipple retention force is obtained through an interference fit of the nipple to the hose, thus increasing the friction between the hose I.D. and the nipple O.D. Further nipple retention force is provided by the concentric deformation of the hose cover by the hose clamps. By applying a force perpendicular to and towards the axis of the hose, the clamps increase the friction between the hose I.D. and nipple O.D. Also, the hose clamps are located behind each of two barbed serrations of the hose nipple. This forms a mechanical lock between the area of high compression created by the hose clamp and the barbed serrations. Further, the polyamide liner is sufficiently thick so that it is able to resist tearing due to the relatively high force of the barbed serrations on the liner. If the hose is allowed to radially expand as it is pressurized, the effectiveness of the mechanisms responsible for nipple retention force is reduced. The potential for this radial expansion is resisted by two heavy fabric reinforcing braids.

The present invention seals by the placement of two O-ring seals between the nipple O.D. and the hose I.D. These O-rings are held by grooves dimensioned so that deflection of the seals when under radial compression is virtually eliminated. As the hose ages and the rubber hose begins to flow away from the areas of high compression (the sealing areas), the O-ring seals maintain their original shapes and positions. Because only a small portion of the O-ring seals' surfaces are exposed to the hose I.D., a relatively higher sealing pressure is achieved when a force perpendicular to and towards the axis of the hose is applied to such surfaces. These features promote a longer sealing life. On the contrary, the fitting of the Manuli reference seals by the use of two gaskets located between the nipple O.D. and hose I.D. These gaskets are contained in grooves dimensioned so that the gaskets are permitted to deform when they are radially compressed. As the hose ages, both the hose's rubber layers and the gaskets flow away from the areas of high compression. Because each gasket exposes a larger surface area to the hose I.D., the sealing pressure obtained by applying a force perpendicular to and towards the axis of the hose is relatively small. These features lead to a relatively shorter seal life.

The fitting of the present invention maintains the position of the O-ring seals during the assembly of the hose to the nipple by the O-ring grooves' dimensions. Each side of an O-ring groove is dimensioned so that the O-ring cross-section's center point is located below the edge of the groove. On the contrary, the Manuli reference fitting utilizes gaskets that are shaped so that they resist rolling.

The present invention utilizes the friction between the hose O.D. and the I.D. of the hose clamps. This is achieved through the use of a hose cage which, in one embodiment, snaps into a groove on the nipple and retains the clamps in two channels. The hose cage mechanically locks the nipple to transfer the friction force from the O.D. of the hose to the nipple. The Manuli reference fitting achieves nipple retention through the utilization of a much thicker polyamide liner to resist tearing under the friction load of the nipple on the hose liner. It also uses two heavy reinforcement braids that allow the hose to resist radial expansion during pressurization. The use of these hose features for nipple retention results in a hose that is relatively inflexible.

Finally, the present invention utilizes hose cages which snap onto the nipple at fixed locations. The clip contains two channels which locate the hose clamps on the hose cover. The Manuli reference fitting utilizes a bar which is permanently connected to the two hose clamps and locates off of the end of the hose.

Accordingly, the present invention provides an improved fitting that overcomes the above-identified problems associated with prior art fittings.

SUMMARY OF THE INVENTION

The present invention is directed to a clip fitting for a hose. The fitting includes a hose nipple that defines at least one circular groove. An O-ring seal having a circular cross sectional configuration is positioned in the groove. The depth of the groove in relation to the cross sectional size of the O-ring seal is such that the cross sectional center of the O-ring seal is positioned below the edges of the groove so that less than one-half of the O-ring seal extends out of the groove. A hose is positioned on the nipple. The inside surface of the hose engages the O-ring seal. At least one hose clip is mounted on the hose nipple. The hose clip is positioned adjacent to the outside surface of the hose. At least one clamp is positioned on the hose clip over the O-ring seal. The clamp forces the inside surface of the hose against the O-ring seal in order to provide an improved seal between the hose nipple and the hose.

It is the primary object of the present invention to provide a clip fitting for a hose that allows for an improved seal between a hose nipple and a hose.

Other objects and advantages of the present invention shall become apparent to those skilled in the art upon a review of the following detailed description of the preferred embodiments and the accompanying drawings.

DETAILED DESCRIPTION OF THE PREFERRED EMBODIMENTS

Figure 1:
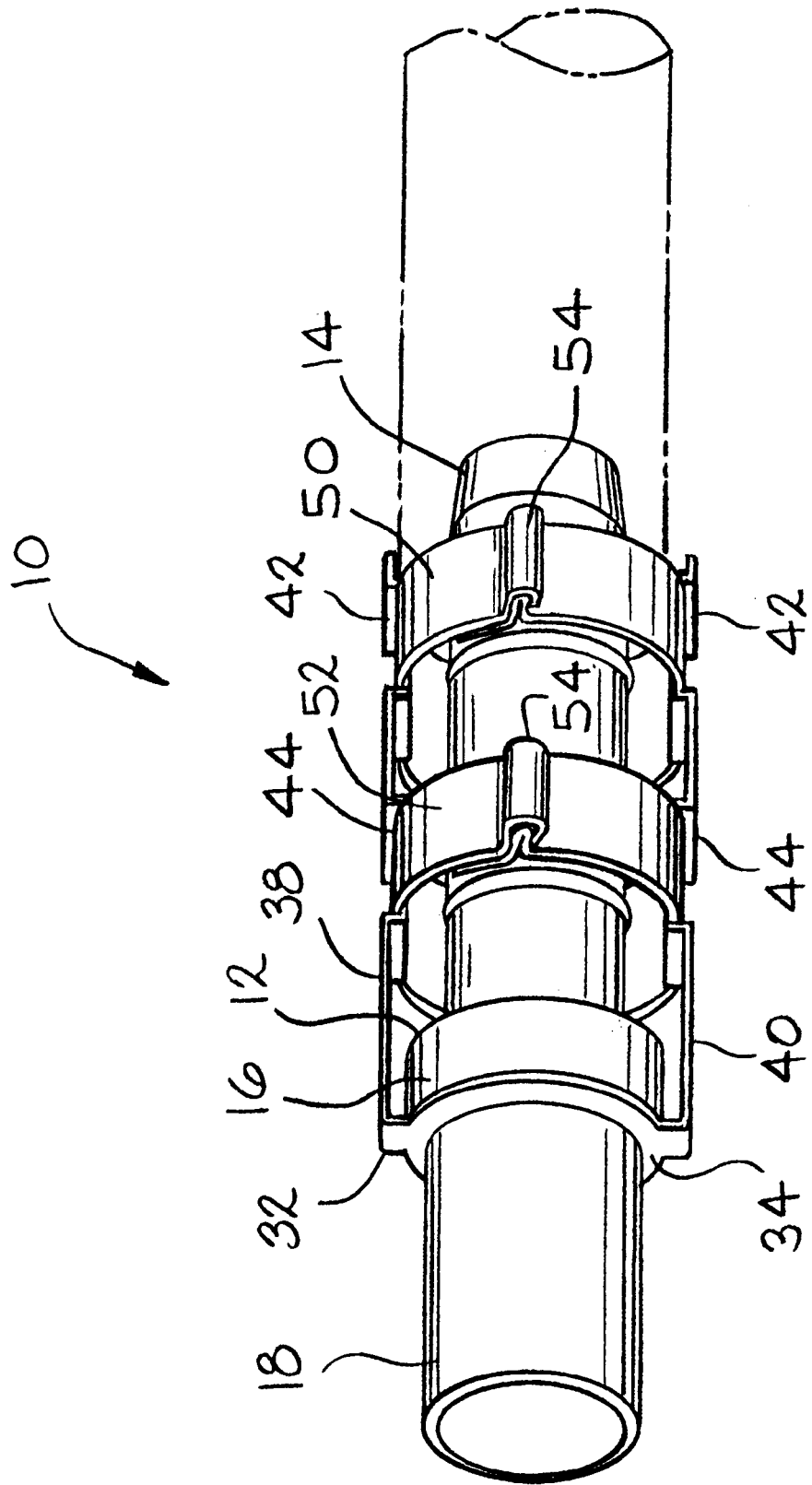
FIG. 1 is a perspective view showing a clip fitting for a hose according to the present invention.

The preferred embodiments and best mode of the present invention will now be described in detail with reference being made to the drawings. The clip fitting for a hose of the present invention is indicated generally in the drawings by the reference number "10".

Figure 9:
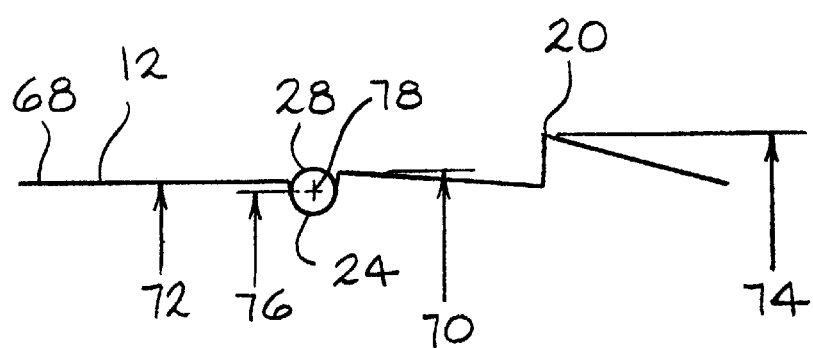
FIG. 9 is a is a detailed cross-sectional view of the exterior surface of the hose nipple and O-ring seal according to the present invention.

Referring to FIGS. 1–4 and 9, the fitting 10 of the present invention includes a hose nipple 12 having a nipple end 14, an annular shoulder 16 and a brazed tube 18. The nipple end 14 defines an annular first serration 20 and an annular second serration 22 spaced from the first serration. The nipple end 14 further defines an annular first groove 24 adjacent to the first serration 20 and an annular second groove 26 adjacent to the second serration 22. As shown in FIG. 9, each of the first and second grooves 24 and 26 has a circular cross-section. In a preferred embodiment, the hose nipple 12 is made of steel. The hose nipple 12 is hollow thereby allowing for the flow of fluid therethrough.

Referring to FIGS. 1–3 and 9, the fitting 10 includes an annular first O-ring seal 28 positioned in the first groove 24. An annular second O-ring seal 30 is positioned in the second groove 26. As shown in FIG. 9, each of the first and second O-ring seals 28 and 30 has a circular cross-section. The first and second O-ring seals 28 and 30 are sized and adapted to be received by the circular first and second grooves 24 and 26, respectively. This arrangement acts to restrict movement, such as rolling, of the seals in the grooves. In a preferred embodiment, the O-ring seals 28 and 30 of the present invention consist of conventional compressible elastomeric materials.

Figure 2:
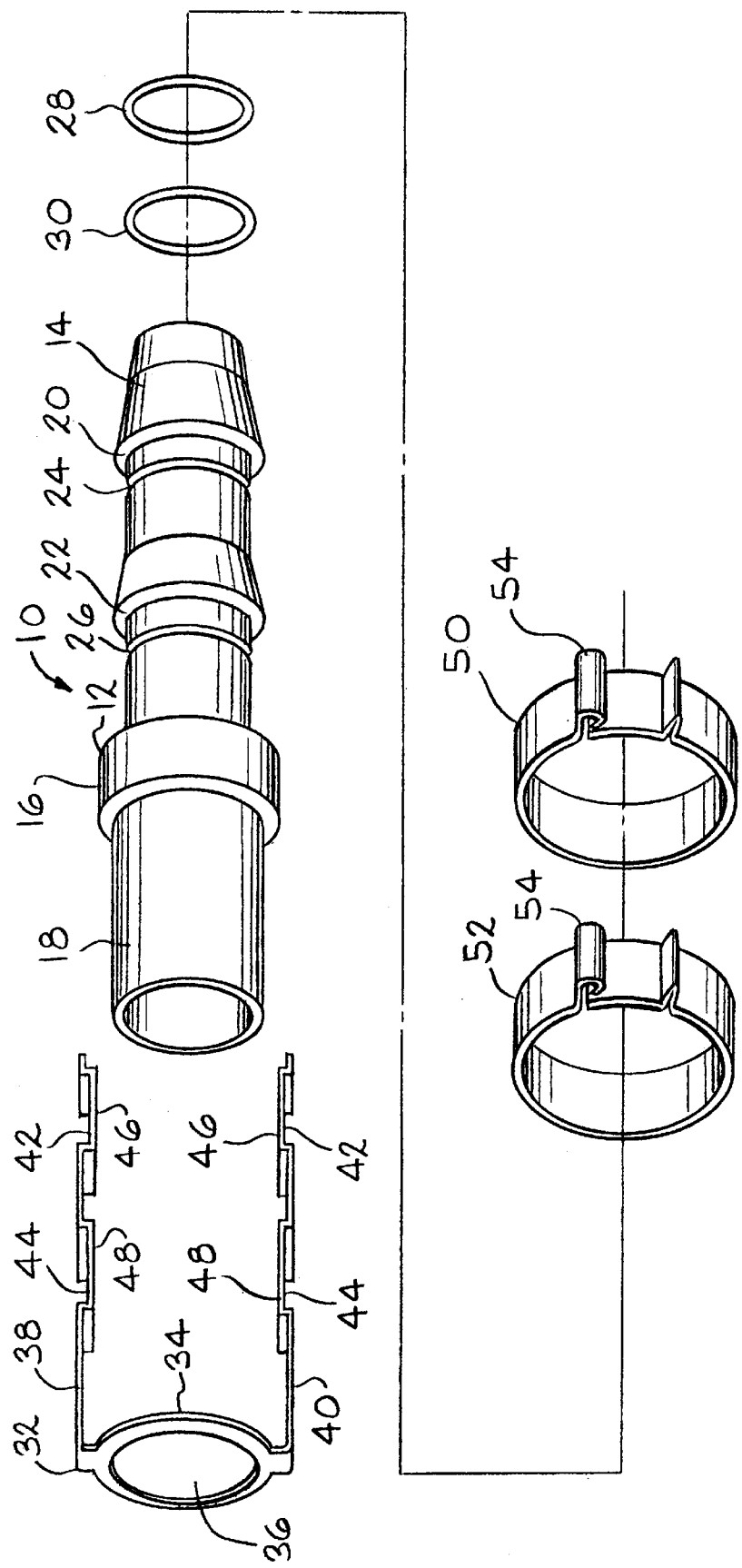
FIG. 2 is an exploded view of the clip fitting for a hose shown in FIG. 1.
Figure 4:
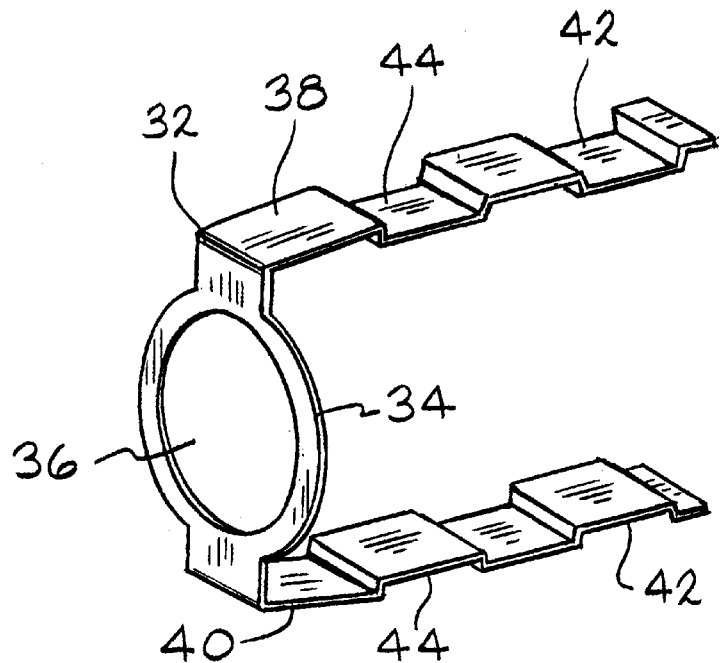
FIG. 4 is a perspective view of a first embodiment cage according to the present invention.

Referring to FIGS. 1, 2 and 4, the fitting 10 has a cage 32. The cage 32 includes an attachment member 34 that defines an opening 36. The opening 36 is adapted to receive the brazed tube 18 of the hose nipple 12. The attachment member 34 is adapted to engage the annular shoulder 16 of the hose nipple 12. The cage 32 includes a first hose clip 38 and a second hose clip 40 opposed to the first hose clip. Each of the first and second hose clips 38 and 40 includes a first clamp receiving portion 42 and a second clamp receiving portion 44. Each of the first and second hose clips 38 and 40 also includes a first hose contact surface 46 and a second hose contact surface 48. In a preferred embodiment, the cage 32 is made of steel.

Referring to FIGS. 1 and 2, the fitting 10 includes a first clamp 50 and a second clamp 52. The first clamp 50 is received by the first clamp receiving portions 42 of the first and second hose clips 38 and 40. The second clamp 52 is received by the second clamp receiving portions 44 of the first and second hose clips 38 and 40. Each of the first and second hose clamps 50 and 52 includes a locking mechanism 54. In a preferred embodiment, the first and second clamps 50 and 52 are made of steel.

Figure 3:
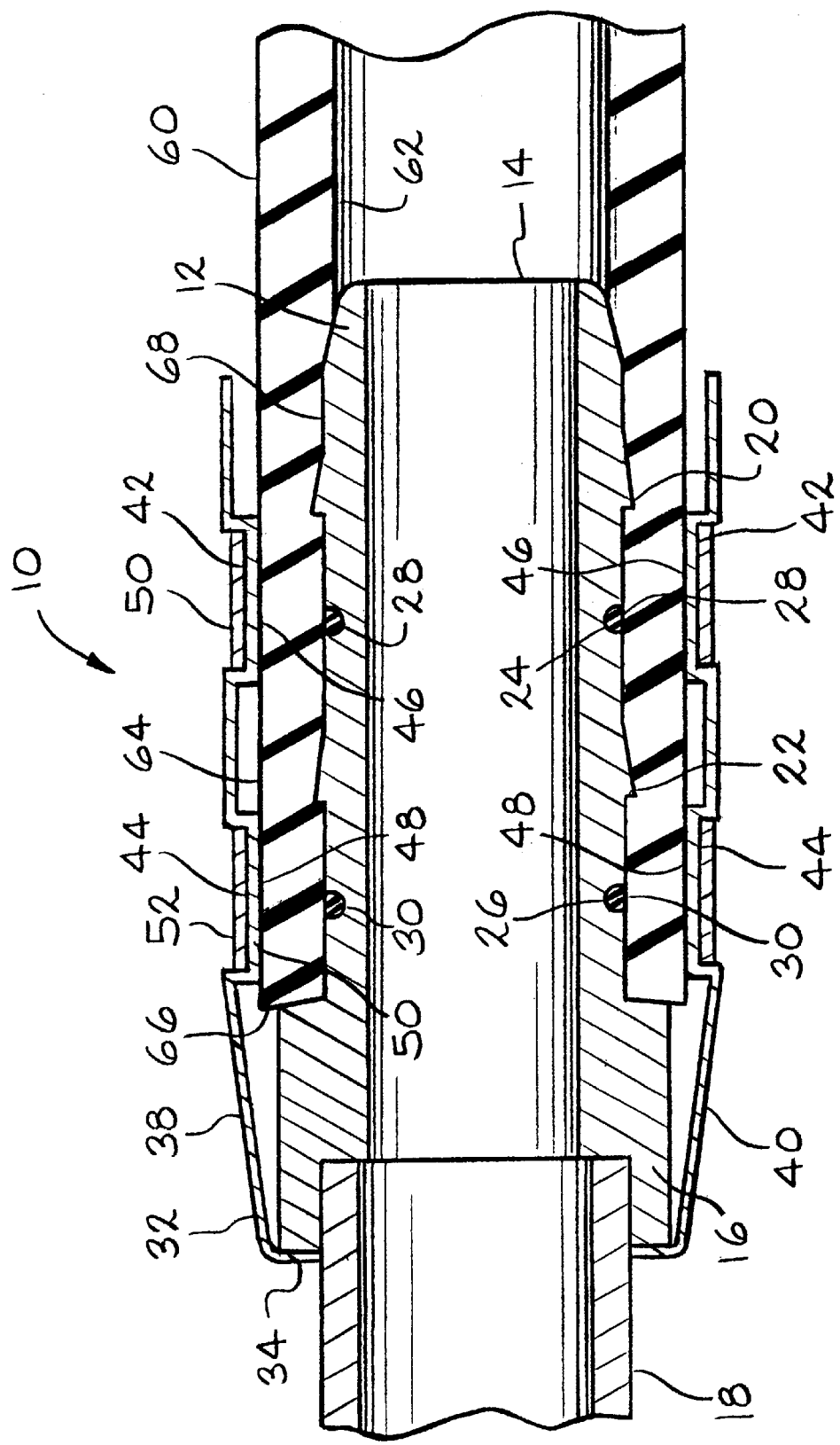
FIG. 3 is a cross-sectional view taken through the center of the clip fitting for a hose as shown in FIG. 1.

Referring to FIG. 3, the intended use of the present invention is shown. The fitting 10 is used in conjunction with a hose 60, such as a flexible polyamide lined hose, that includes an inside surface 62, an outside surface 64 and a terminal end 66. The hose 60 is positioned on the hose nipple 12 of the fitting 10. The terminal end 66 engages the annular shoulder 16. The inside surface 62 of the hose 60 engages the exterior surface 68 of the hose nipple 12 to create an interference fit. The inside surface 62 is engaged by the first and second serrations 20 and 22 to hold the hose 60 in proper position on the hose nipple 12. The inside surface 62 engages the first and second O-ring seals 28 and 30. The inside surface 62 defines a hollow space to provide for the flow of fluid through the hose 60 and the fitting 10.

Still referring to FIG. 3, the first and second hose clips 38 and 40 of the cage 32 are positioned on the outside surface 64 of the hose 60. The first and second hose contact surfaces 46 and 48 engage the outside surface 64. As shown in FIG. 3, the first and second clamp receiving portions 42 and 44 are positioned directly over and in alignment with the first and second O-ring seals 28 and 30. The first and second clamps 50 and 52 are received by the first and second clamp receiving portions 42 and 44. When the first and second clamps 50 and 52 are tightened and locked, the clamps force the first and second hose contact surfaces 46 and 48 against the outside surface 64 of the hose 60. The clamping forces are transferred through the hose 60 to the inside surface 62. This results in the snug engagement of the inside surface 62 of the hose 60 with an exterior surface 68 of the hose nipple 12 and the first and second O-ring seals 28 and 30. The first and second clamps 50 and 52 create localized regions of high compression along the exterior surface 68 of the hose nipple 12 adjacent to the first and second O-ring seals 28 and 30. These regions of high compression cause the material of the hose 60 to flow or move away from the first and second hose clamps 50 and 52 to form mechanical locks adjacent to the clamps. It has been found that the fitting 10 of the present invention provides for an improved seal between the inside surface 62 of the hose 60 and the exterior surface 68 of the hose nipple 12 as compared to prior fittings.

As shown in FIG. 9, the improved seal of the present invention is due to the geometries of the first and second grooves 24 and 26 (the first groove 24 is shown in FIG. 9), the first and second O-ring seals 28 and 30 (the first O-ring seal 28 is shown in FIG. 9), the first and second serrations 20 and 22 (the first serration 20 is shown in FIG. 9) and the exterior surface 68 of the hose nipple 12. As shown in FIG. 9, the exterior surface 68 defines a protection diameter 70 and a support diameter 72 adjacent to, for example, the first groove 24. The protection diameter 70 is closer to the end 14 than the support diameter. The exterior surface 68 defines a serration diameter 74 adjacent to, for example, the first serration 20. The first O-ring seal 28, for example, defines an O-ring seal diameter 76 at the center-point 78 of the O-ring seal 28.

As shown in FIG. 9, the first O-ring groove 24 is dimensioned so that the protection and support diameters 70 and 72 are larger than the O-ring seal diameter 76. Further, the protection diameter 70 is larger than the support diameter 72. When the protection and support diameters 70 and 72 are larger than the O-ring seal diameter 76, the resultant forces from the first O-ring groove 24 on the first O-ring seal 28 are toward the center line C of the hose nipple 12. Thus, the depth of the groove 24 is such that the cross-sectional center 78 of the O-ring seal 28 is below the protection and support diameters 70 and 72 and, therefore, closer to the centerline C of the hose nipple 12. As a result less than one-half of the O-ring seal 28 extends outwardly from the protection and support diameters 70 and 72. This increases the force required to laterally displace the first O-ring seal 28 from the first groove 24 and minimizes the chance of the O-ring seal 28 being inadvertently displaced from the groove 24.

As it will be appreciated, only a small portion of the first O-ring seal 28 is exposed to the interior surface 62 of the hose 60. This is critical for sealing performance. As the hose 60 ages, the hose 60 takes a severe compression set at the localized areas of high compression adjacent to the first and second grooves 24 and 26. This decreases the radial force of the hose onto the O-ring seal 28. Because only a small portion of the O-ring seal 28 is in contact with the hose 60, the sealing area is nearly linear. This small area of sealing allows a higher sealing pressure when the force on the O-ring seal 28 from the hose is decreased. Because the O-ring groove 24 is shaped to tightly contour the O-ring seal 28, there is no area for the O-ring seal 28 to flow or move away from the compression. This decreases the effect of compression set on the O-ring seal 28. Similarly only a small portion of the O-ring seal 30 is exposed to the interior surface 62 of the hose 62.

Figure 5:
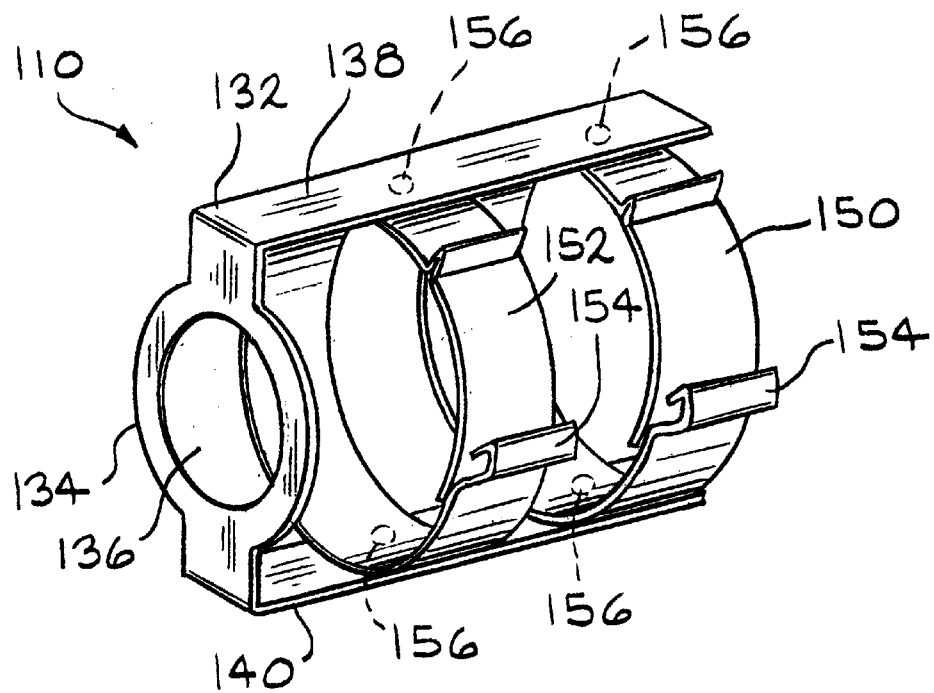
FIG. 5 is a perspective view of a second embodiment clip fitting according to the present invention.

A second embodiment fitting 110 is shown in FIG. 5. The fitting 110 is used in conjunction with a hose nipple 12 including first and second O-ring seals 28 and 30 as described above. In this embodiment, the fitting 110 includes a cage 132 having an attachment member 134 that defines an opening 136. The cage 132 includes a first hose clip 138 and a second hose clip 140 opposed to the first hose clip 138. First and second clamps 150 and 152 are positioned between the first and second hose clips 138 and 140. Each of the first and second clamps 150 and 152 includes a locking mechanism 154. The first and second clamps 150 and 152 are fixedly attached to the first and second hose clips 138 and 140 by spot welds 156.

Figure 6:
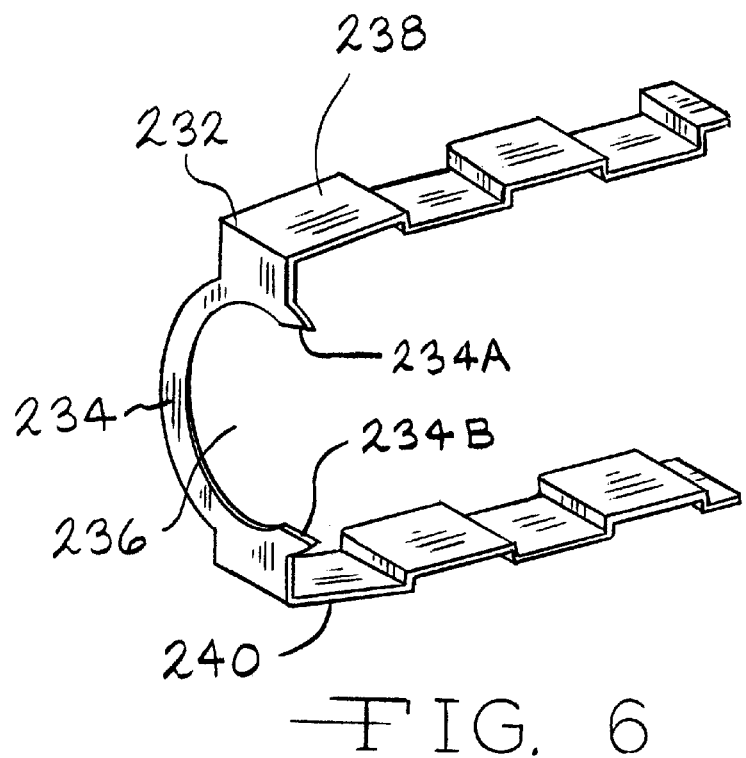
FIG. 6 is a third embodiment cage according to the present invention.

A third embodiment cage 232 is shown in FIG. 6. In this embodiment, the cage 232 includes an attachment member 234 that defines an opening 236. In this embodiment, the attachment member 234 is in the shape of a semi-circle having a circumferential extent less that 3600 to provide a gap between circumferential ends 234A and 234B. This allows the attachment member 234 to be slipped laterally over the brazed tube 18 (i.e., in a direction perpendicular to the centerline C) so that the fitting can be installed in the field without the need to disconnect the brazed tube 18 from the fluid member to which it is attached. The third embodiment cage 232 includes first and second hose clips 238 and 240 substantially as described above with respect to the first embodiment cage 32 as shown in FIG. 4.

Figure 7:
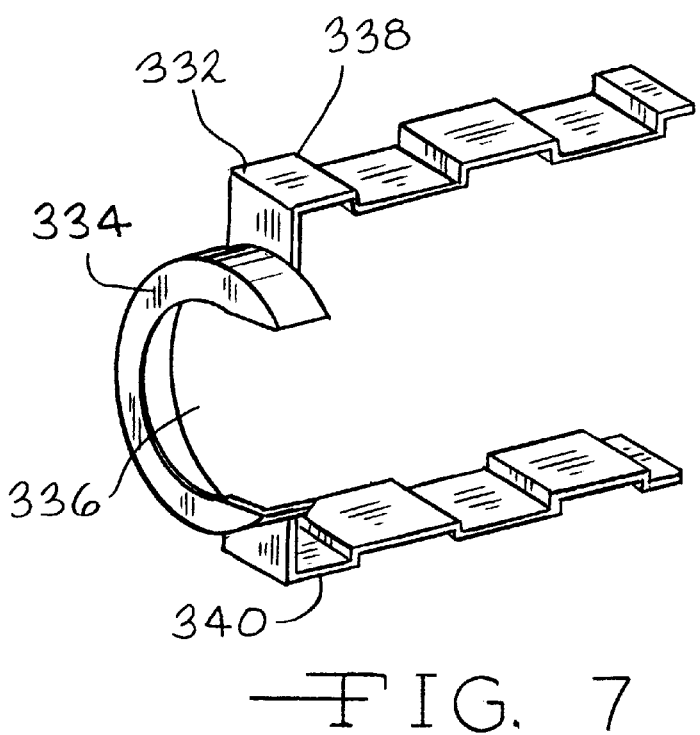
FIG. 7 is a fourth embodiment cage according to the present invention.

A fourth embodiment cage 332 is shown in FIG. 7. The cage 332 includes an attachment member 334 that defines an opening 336. The attachment member 334 has a semi-circular shape as described above in relation to the third embodiment cage 232. Further, the attachment member 334 has a shape that is adapted to receive an annular shoulder 16 as shown in FIG. 1. The fourth embodiment cage 332 includes first and second hose clips 338 and 340 as described above in relation to the first embodiment cage 32 as shown in FIG. 4.

Figure 8:
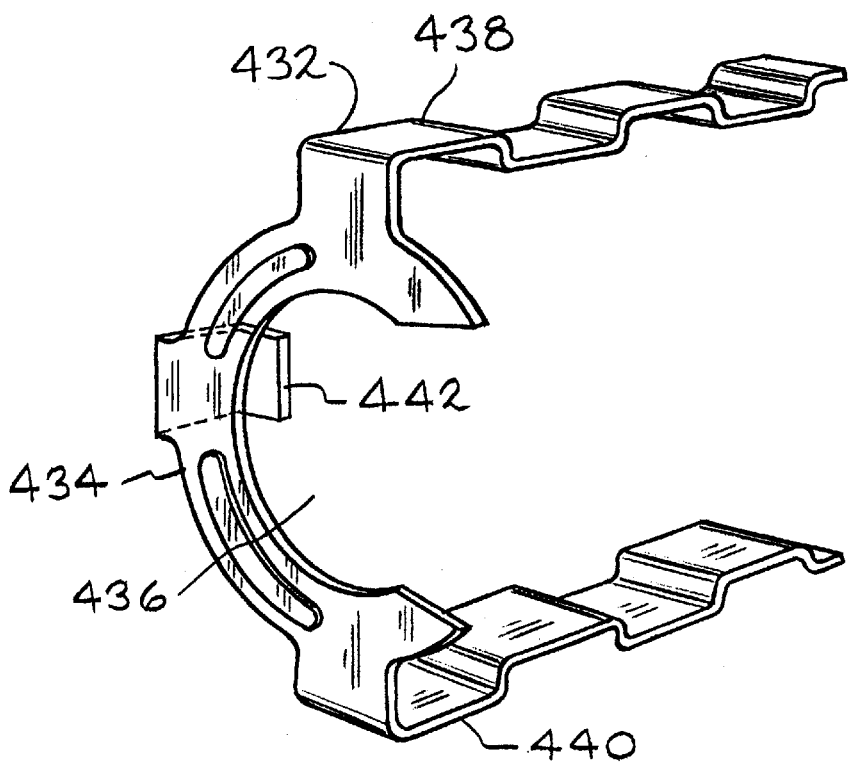
FIG. 8 is a fifth embodiment cage according to the present invention.

A fifth embodiment cage 432 is shown in FIG. 8. The cage 432 includes an attachment member 434 that defines an opening 436. The attachment member 434 has a semi-circular shape as described above in relation to the third embodiment cage 232. Further, the attachment member 434 has a shape that is adapted to receive an annular shoulder 16 as shown in FIG. 1. The fifth embodiment cage 432 includes first and second hose clips 438 and 440 as described above in relation to the first embodiment cage 32 as shown in FIG. 4. The cage 432 further includes a shoulder clip 442 that is adapted to receive and engage the annular shoulder 16.

Figure 10:
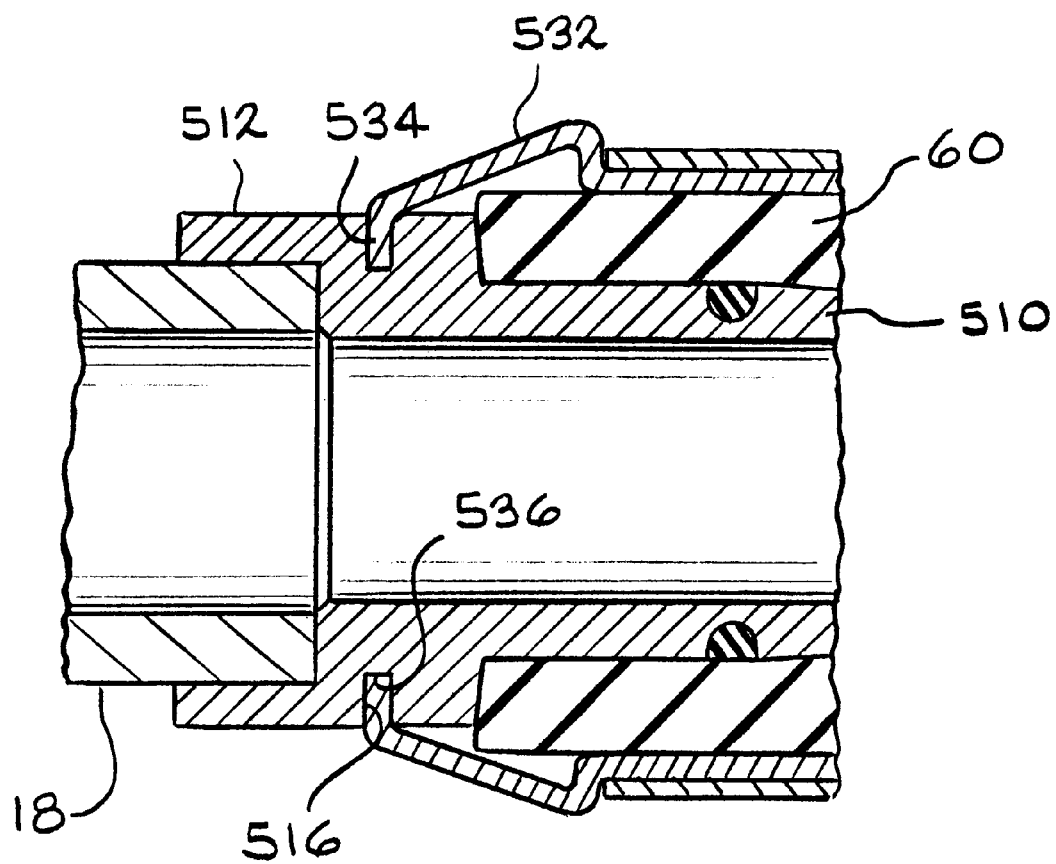
FIG. 10 is a detailed cross-sectional view of an alternative embodiment hose nipple and cage according to the present invention.

An alternative embodiment hose nipple and cage is shown in FIG. 10. In this embodiment, the hose nipple 510 has a connecting end 512 with an annular cage groove 516. The cage 532 includes an attachment member 534 having an opening 536 that is sized and adapted to receive the nipple connecting end 512 with the attachment member 534 being received within the cage groove 516. An example of a cage that can be used in this embodiment is shown in FIG. 6. The primary advantage of this embodiment is that, in addition to being able to be slipped laterally into the annular cage groove 516, the size of the opening 536 corresponds in size with the annular cage groove 516 and not in size with the tube 18 or the connecting end 512. As a result, a single cage 532 can be used with nipples having a variety of sizes of connecting ends 512.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

We claim:

1. A clip fitting for a hose, comprising:
    a hose nipple having an exterior surface defining at least one generally circumferential groove, said exterior surface defining a protection diameter immediately adjacent to and extending to said groove and a support diameter immediately adjacent to and extending to said groove on the opposite side of said groove from said protection diameter, said protection diameter being larger than said support diameter;
    an O-ring seal having a generally circular cross section positioned in said groove, said O-ring seal defining an O-ring seal diameter at a cross sectional center-point of said O-ring seal, said protection and support diameters being larger than said O-ring seal diameter;
    at least one hose clip positioned adjacent to said hose nipple; and
    at least one clamp positioned on said hose clip in alignment with said O-ring seal.

2. The clip fitting of claim 1, wherein said groove is sized to prevent lateral movement of said O-ring seal therein.

3. The clip fitting of claim 1, wherein said hose nipple includes at least one serration adjacent to said groove.

4. The clip fitting of claim 1, wherein said hose clip is mounted on an attachment member having an opening that is adapted to receive said hose nipple.

5. The clip fitting of claim 4, wherein said hose nipple includes an annular cage groove, said annular cage groove being adapted to receive said attachment member.

6. The clip fitting according to claim 5, wherein said attachment member has a circumferential extent less than 360° to provide a gap permitting said attachment member to be moved laterally into said annular cage groove.

7. The clip fitting of claim 1, wherein said hose clip includes at least one clamp receiving portion.

8. A combination comprising:
   (a) a hose having an inner surface, an outer surface and an end;
   (b) a nipple having
      (i) a first nipple end portion sized to be snugly received within said hose in engagement with said inner surface, said first nipple end portion having an outwardly facing annular first groove, said first nipple end portion having a protection diameter immediately adjacent to and extending to said first groove and a support diameter immediately adjacent to and extending to said first groove on the opposite side of said first groove from said protection diameter, said protection diameter being larger than said support diameter;
      (ii) a second portion extending from said first nipple end portion axially outwardly from said hose, said second portion having an outwardly facing second groove;
   (c) an O-ring seal positioned in said first groove in sealing engagement with said hose inner surface; and
   (d) a cage engaged to said hose outer surface in an axial position overlying said O-ring seal and having an attachment member engaged in said second groove.

9. The combination according to claim 8, wherein said first groove is sized to prevent lateral movement of said O-ring seal therein.

10. The combination according to claim 8, wherein said first groove has a depth less than the cross sectional diameter of said O-ring seal but greater than one-half of said cross sectional diameter.

11. The combination according to claim 8, wherein said attachment member engaged in said second groove extends circumferentially less than 360° to provide a gap permitting said attachment member to be moved laterally into said second groove.

12. A clip fitting for a hose, comprising:
   a hose nipple extending from a first end to a second end and having
      (i) an exterior surface adjacent to said first end adapted to be received in said hose;
      (ii) at least one generally circumferential groove;
      (iii) a projection diameter immediately adjacent to said groove;
      (iv) a support diameter immediately adjacent to said groove on the opposite side of said groove from said projection diameter, said protection diameter being larger than said support diameter; and
      (v) an outwardly extending serration between said groove and said first end, said protection diameter being positioned between said groove and said serration;
   an O-ring seal having a generally circular cross section positioned in said groove, said O-ring seal defining an O-ring seal diameter at a cross sectional center-point of said O-ring seal, said protection and support diameters being larger than said O-ring seal diameter, said groove being sized relative to said O-ring seal to prevent lateral movement of said O-ring seal in said groove;
   at least one hose clip positioned adjacent to said hose nipple, said hose clip being mounted on an attachment member, said attachment member having an opening adapted to receive said hose nipple; and
   at least one clamp positioned on said hose clip in alignment with said O-ring seal.

13. The clip fitting of claim 12, wherein said hose nipple includes a cage groove, said cage groove being adapted to receive said attachment member.

14. The clip fitting according to claim 13, wherein said attachment member is positioned in said cage groove and has a circumferential extent less than 360° to provide a gap permitting said attachment member to be moved laterally into said cage groove.

15. The clip fitting of claim 12, wherein said hose clip includes at least one clamp receiving portion and at least one hose contact surface.

\* \* \* \* \*